(12) United States Patent
Agrawal et al.

(10) Patent No.: US 9,480,043 B2
(45) Date of Patent: Oct. 25, 2016

(54) METHOD AND APPARATUS FOR NETWORK BASED POSITIONING

(71) Applicant: QUALCOMM Incorporated, San Diego, CA (US)

(72) Inventors: Meghna Agrawal, Sunnyvale, CA (US); Praveen Dua, Cupertino, CA (US)

(*) Notice: Subject to any disclaimer, the term of this patent is extended or adjusted under 35 U.S.C. 154(b) by 212 days.

(21) Appl. No.: 14/262,577

(22) Filed: Apr. 25, 2014

(65) Prior Publication Data

US 2015/0312881 A1    Oct. 29, 2015

(51) Int. Cl.
| | | |
|---|---|---|
| *H04W 24/00* | (2009.01) | |
| *H04W 64/00* | (2009.01) | |
| *H04W 28/02* | (2009.01) | |
| *H04W 72/04* | (2009.01) | |
| *H04W 72/12* | (2009.01) | |

(52) U.S. Cl.
CPC ....... *H04W 64/006* (2013.01); *H04W 28/0226* (2013.01); *H04W 28/0289* (2013.01); *H04W 64/00* (2013.01); *H04W 72/0453* (2013.01); *H04W 72/12* (2013.01)

(58) Field of Classification Search
CPC ... H04W 64/00; H04W 4/02; H04W 64/006; H04W 28/0226; H04W 28/0289; H04W 72/0453; H04W 72/12; G01S 5/0009; G01S 5/0284; H04L 67/18
USPC .......................................... 455/456.1–456.6
See application file for complete search history.

(56) References Cited

U.S. PATENT DOCUMENTS

| | | | | |
|---|---|---|---|---|
| 5,966,662 | A * | 10/1999 | Murto | H04W 68/00 340/7.25 |
| 8,509,822 | B1 | 8/2013 | Hou et al. | |
| 2002/0037735 | A1* | 3/2002 | Maggenti | H04L 63/0428 455/517 |
| 2005/0015285 | A1 | 1/2005 | Tamaki | |
| 2005/0101331 | A1* | 5/2005 | Tamaki | H04W 64/00 455/456.1 |
| 2006/0105771 | A1 | 5/2006 | Iacono et al. | |
| 2008/0181184 | A1 | 7/2008 | Kezys | |
| 2009/0318182 | A1* | 12/2009 | Nagato | H04W 52/143 455/522 |

(Continued)

FOREIGN PATENT DOCUMENTS

CN    103209475 A    7/2013

OTHER PUBLICATIONS

International Search Report and Written Opinion—PCT/US2015/026706—ISA/EPO—Jul. 21, 2015.

*Primary Examiner* — Olumide T Ajibade Akonai
(74) *Attorney, Agent, or Firm* — Blakely Sokoloff Taylor & Zafman (57) ABSTRACT

Disclosed is a system, apparatus, computer readable storage medium, and method to perform a bandwidth efficient network based positioning (NBP). A positioning request for a mobile device is received within an environment, the environment comprising one or more access points (APs). An AP coverage area including the mobile device is determined. A NBP load for the AP is measured, wherein the NBP load comprises a direct NBP load and an indirect NBP load. If the NBP load is less than a threshold, the AP is instructed to process the first positioning request. Multiple APs may process positioning requests concurrently and positioning requests may be scheduled according to timeout and/or relative expiration.

30 Claims, 4 Drawing Sheets

(56) References Cited

U.S. PATENT DOCUMENTS

| | | |
|---|---|---|
| 2010/0091651 A1 | 4/2010 | Chin et al. |
| 2010/0105414 A1 | 4/2010 | Ioppe et al. |
| 2010/0173644 A1* | 7/2010 | Koyanagi ............... H04B 7/155 455/453 |
| 2010/0322124 A1* | 12/2010 | Luoma .............. H04W 72/1242 370/311 |
| 2011/0151886 A1* | 6/2011 | Grayson ................ H04W 16/04 455/452.1 |
| 2011/0222471 A1 | 9/2011 | Abraham et al. |
| 2013/0230028 A1 | 9/2013 | Calcev et al. |

* cited by examiner

METHOD AND APPARATUS FOR NETWORK BASED POSITIONING

FIELD

The subject matter disclosed herein relates generally to network based positioning, and more specifically to efficient bandwidth use in network based positioning.

BACKGROUND

Position location for mobile devices can provide various services. For example, retailers can offer a higher level of customized services such as concierge services or promotions tailored to the user's profile and history with the retailer if the users opt to share their accurate location within the store. Similarly, public venues such as airports and museums can efficiently deliver higher level of services if they have the knowledge of where their users are within the venue in a timelier and more context aware manner. For example, an airport venue may provide accurate estimates of time to the gate incorporating real-time assessment of security checkpoints. The airport venue could provide reminders of flight boarding if a user is far away from their gate before boarding time (e.g., taking into account the user's current location and estimated time to make it back to the gate). Additionally the airport venue could suggest suitable outlets nearby if a user is unfamiliar with the area (e.g., saving time to find their preferred brand of coffee or pizza). There are many possible use cases for various levels of position accuracy (e.g., city block level, 50 m, 10 m, 5 m, etc.).

Conventional position location techniques based upon signals provided by Satellite Positioning Systems and/or cellular base stations may encounter difficulties when a mobile device is operating within a building and/or within urban environments. In such situations, signal reflection and refraction, multipath, and/or signal attenuation can significantly reduce position accuracy, and can slow the "time-to-fix" to unacceptably long time periods. These shortcomings may be overcome by having the mobile device exploit signals from network based positioning (NBP), such as Wi-Fi (e.g., IEEE 802.11x standards), to derive position information. Conventional NBP techniques may utilize round trip time (RTT) measurements derived from signals utilized within a network of wireless access points. A wireless access point (AP) can be a device that allows wireless devices to connect to a wired network using Wi-Fi, or other wireless standards.

Utilizing NBP measurement techniques to determine position typically involves requesting positioning information from nearby APs of the mobile device. A limitation of NBP systems is in the allocation and management of limited wireless bandwidth. For example, multiple mobile devices simultaneously requesting positioning information from an AP may saturate the limited bandwidth of the AP. If the AP schedules measurement requests for all the requests simultaneously, the AP will be overloaded with measurement requests and cannot take measurements for all the devices. Furthermore, collision probability will be high. Multiple simultaneous positioning requests will also result in high NBP load (e.g., NBP load associated with servicing network positioning or location requests), creating inefficiencies. If all the requests are scheduled sequentially, then the AP may not be able to process every request. High traffic areas such as malls may benefit from NBP but may also be susceptible to network overload. Additionally, APs generally will set aside a smaller percentage of overall network bandwidth for positioning, and instead allocate most bandwidth to data connections. There is a need for a NBP system that is able to efficiently allocate network bandwidth.

SUMMARY

Embodiments disclosed herein may relate to a method for network based positioning. The method includes receiving a first positioning request for a mobile device within an environment, the environment comprising a plurality of access points (APs). The method further includes determining the mobile device is within a coverage area of a first AP in the plurality of APs. The method further includes measuring a NBP load for the first AP, wherein the NBP load comprises a direct NBP load and an indirect NBP load and determining the NBP load for the first AP is less than a threshold NBP load. The method also includes instructing the first AP to process the first positioning request.

A machine readable non-transitory storage medium containing executable program instructions which cause a data processing device to perform a method for network based positioning. The method includes receiving a first positioning request for a mobile device within an environment, the environment comprising a plurality of access points (APs). The method further includes determining the mobile device is within a coverage area of a first AP in the plurality of APs. The method further includes measuring a NBP load for the first AP, wherein the NBP load comprises a direct NBP load and an indirect NBP load and determining the NBP load for the first AP is less than a threshold NBP load. The method also includes instructions for instructing the first AP to process the first positioning request.

Embodiments disclosed herein may further relate to a server including a processor and a storage device configurable to perform network based positioning for the data processing system. The system can receive a first positioning request for a mobile device within an environment, the environment comprising a plurality of access points (APs) and determine the mobile device is within a coverage area of a first AP in the plurality of APs. The system can also measure a NBP load for the first AP, wherein the NBP load comprises a direct NBP load and an indirect NBP load and determine the NBP load for the first AP is less than a threshold NBP load. The system may further instruct the first AP to process the first positioning request.

Embodiments disclosed herein may also relate to an apparatus that includes means for receiving a first positioning request for a mobile device within an environment, the environment comprising a plurality of access points (APs). The apparatus further includes means for determining the mobile device is within a coverage area of a first AP in the plurality of APs and means for measuring a NBP load for the first AP, wherein the NBP load comprises a direct NBP load and an indirect NBP load. The apparatus also includes means for determining the NBP load for the first AP is less than a threshold NBP load and instructing the first AP to process the first positioning request.

Other features and advantages will be apparent from the accompanying drawings and from the detailed description.

DETAILED DESCRIPTION

Wireless (e.g., WiFi) access points (APs) can provide location assistance and data access (e.g., web browsing, email, etc.) for user's mobile devices. A location (e.g., building, area, or venue) can install APs in an arrangement to accurately determine user (mobile device) position (e.g., Network Based Positioning). Positioning requests (e.g., location requests) may originate from a mobile device and may be sent to a server (e.g., a positioning server) that may in turn send a request to an AP within range of the mobile device. Under heavy traffic the limited wireless bandwidth within the venue's system may become congested causing delays to data access or Network Based Positioning.

In one embodiment, an Efficient Network Based Positioning (ENBP) system schedules mobile device positioning requests according to determined network availability. ENBP (e.g., implemented at a server) can receive a positioning request from a mobile device within a venue or location. ENBP can determine a visible AP list including APs that communicate within range of each other and determine which visible APs are within range of the mobile device requesting positioning assistance.

In one embodiment, ENBP determines NBP load of the visible APs within range of the mobile device. The NBP load can be a direct NBP load or an indirect NBP load. Direct NBP load can be measured as time spent by a target AP sending data (e.g., packets), receiving data, and managing channel communication (e.g., changing channels). Indirect NBP load can be measured as time spent by a nearby AP (e.g., within range of the aforementioned target AP) sending or receiving data on a home-channel of the target AP. In one embodiment, in response to determining direct and indirect NBP loads, positioning requests are scheduled for processing by APs in disjointed coverage areas concurrently and in a manner to minimize network congestion.

In one embodiment, ENBP minimizes network congestion and collision by limiting NBP load for busy APs. For example, ENBP can hold back (e.g., throttle on the server) received positioning requests from being processed at a respective AP until sufficient network bandwidth becomes available (e.g., according to the NBP load threshold).

Figure 1:
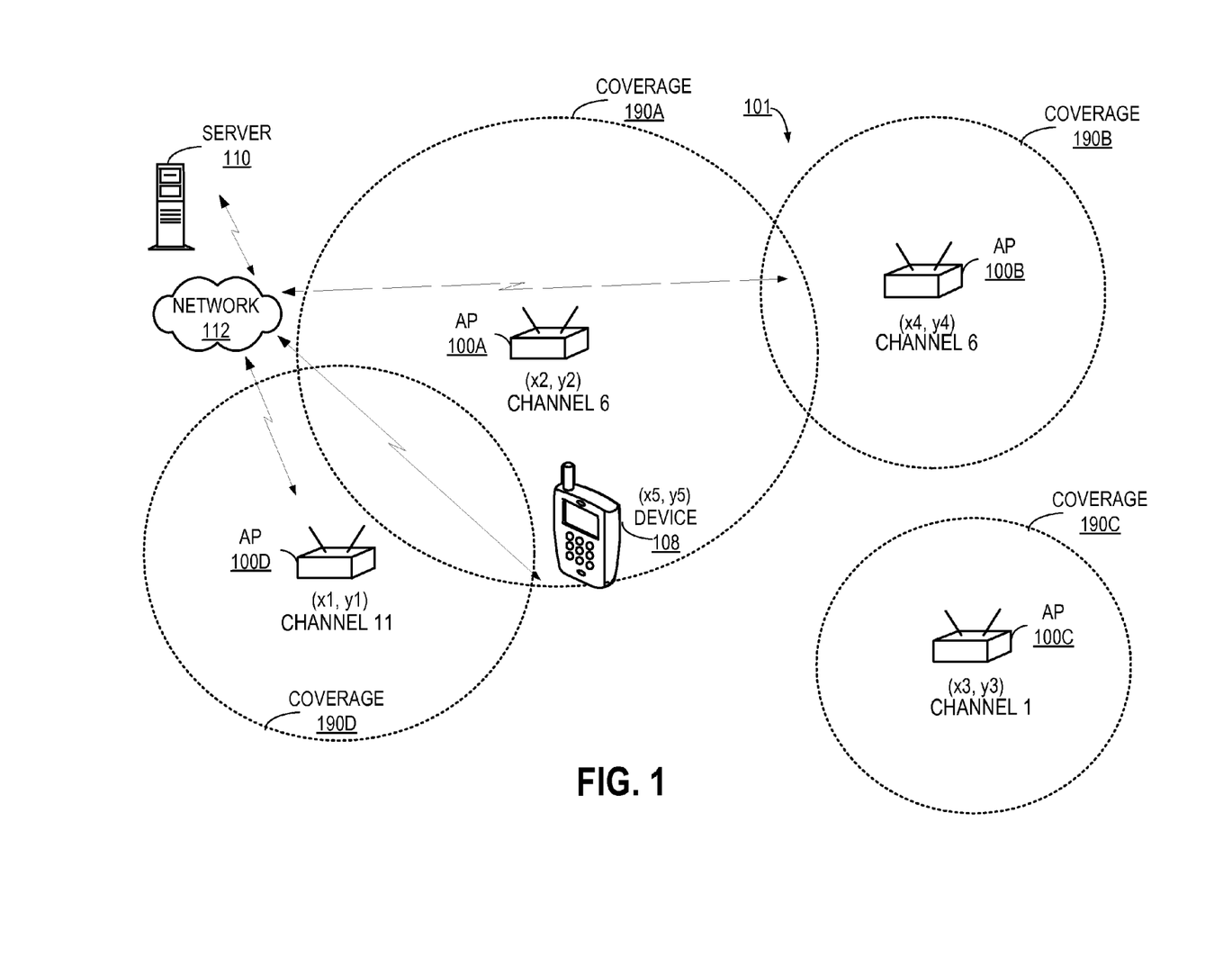
FIG. 1 is a diagram of an exemplary operating environment for Efficient Network Based Positioning (ENBP) consistent with embodiments of the disclosure.

FIG. 1 is a diagram of an exemplary operating environment for ENBP consistent with embodiments of the disclosure. ENBP may be implemented in an environment 101 that can include a mobile device 108, server 110, and one or more APs 100A-D which may contribute towards determining network based position of the mobile device 108. In one embodiment, ENBP is executed on or integrated into the server 110 as illustrated below in FIG. 2. The operating environment 101 may include multiple access points (e.g., APs 100A-D) used for wireless voice and/or data communication, as well as independent sources of position data. The APs 100A-D can be part of a Wireless Local Area Network (WLAN), which may operate in buildings such as offices, shopping centers, outdoors, or in any other installations. APs may be interconnected to each other, the server, and mobile devices via, for example, WiFi networks (802.11x), cellular piconets and/or femtocells, Bluetooth Networks, etc.

In one embodiment, mobile device 108 sends a positioning request to server 110 and server 110 determines which AP if any, will provide measurements associated with the positioning request. The positioning request may be sent to server 110 through network 112, for example, as a http request through a local area network, for example through an associated AP of the WLAN described herein. In other aspects, the wireless communication system used to send the positioning request may comprise a cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In yet other aspects, the mobile device 108 does not initiate the positioning request. For example, the environment (e.g., venue, or building system) may initiate a request for positioning a mobile device within the network. In one such example, upon detecting an intruder or unknown mobile device within the environment, the server may instruct APs within range of the mobile device to determine positioning of the mobile device. For example, the server 110 may initiate mobile device positioning in response to determining an unknown MAC address within a secure or designated area of the venue or environment.

When determining position using AP measurements, the mobile device 108 may utilize time of arrival and signal strength techniques with or without the assistance of the server 110. The server 110 may communicate to the mobile device 108 through network 112. Network 112 may include a combination of wired and wireless networks which incorporate the one or more APs (e.g., APs 100A-D). In one embodiment, each AP may be, for example, a WiFi wireless access point, which may be either in a fixed position or may change location. The position of each AP in a common coordinate system may be known a-priori and stored in the server 110 (e.g., within a location database). In some embodiments, each respective AP can perform range measurement techniques to determine the AP's relative position to other visible APs and mobile devices in the network. Determining relative location of each AP is beneficial for updating AP location when APs are move or are relocated. Range measurements described herein may comprise or may be based at least in part on any of a variety of measurement types, including, for example, time of arrival (TOA), time difference of arrival (TDOA), round trip time (RTT), or received signal strength indicator (RSSI).

In one embodiment, the position of the mobile device 108 may be determined by having the mobile device 108 receive signals from each AP within the network. Each signal may be associated with its originating AP based upon some form of identifying information that may be included in the received signal (such as, for example, a MAC address). The mobile device 108 may then derive the time delays associated with each of the received signals. The mobile device 108 may then form a message which can include the time delays and the identifying information of each of the APs, and send the message via network 112 to the server 110. Based upon the received message, the server may then determine a position, using the stored locations of the relevant APs within the network, of the mobile device 108.

FIG. 1 further illustrates APs 100A-D and the mobile device 108 with X and Y coordinates on a plane (e.g., AP 100A at (x2, y2), AP 100B at (x4, y4), AP 100C at (x3, y3), AP 100D at (x1, y1), and device 108 at (x5, y5)). Areas illustrated with the dotted lines 190A-D show each respective coverage area for AP 100A-D. For example, the mobile device 108 is shown as being within the coverage or visible area 190A associated with AP 100A. The exemplary coverage areas illustrated in 190A-D show a symmetrical circles/spheres, however due to obstructions or interference (e.g., walls, or signal blocking objects) the actual coverage area in some embodiments may be entirely asymmetrical.

Also illustrated in FIG. 1 are exemplary channel configurations for the APs. For example AP 100A is illustrated as having a home-channel of "6." AP 100B is illustrated as also having a home-channel of "6." AP 100C is illustrated as having a home-channel of "1." AP 100D is illustrated as having a home-channel of "11." APs 100A-D may also occasionally operate on other channels (e.g., off home-channel). As illustrated in FIG. 1, AP 100A and AP 100B are within each other's coverage area and are operating on the same home-channel "6." Therefore, AP 100A is a home-channel visible AP to AP 100B and AP 100B is a home-channel visible AP to AP 100A. 100D is an off-channel visible AP to AP 100A, and 100C as illustrated is not visible to AP 100A.

Figure 2:
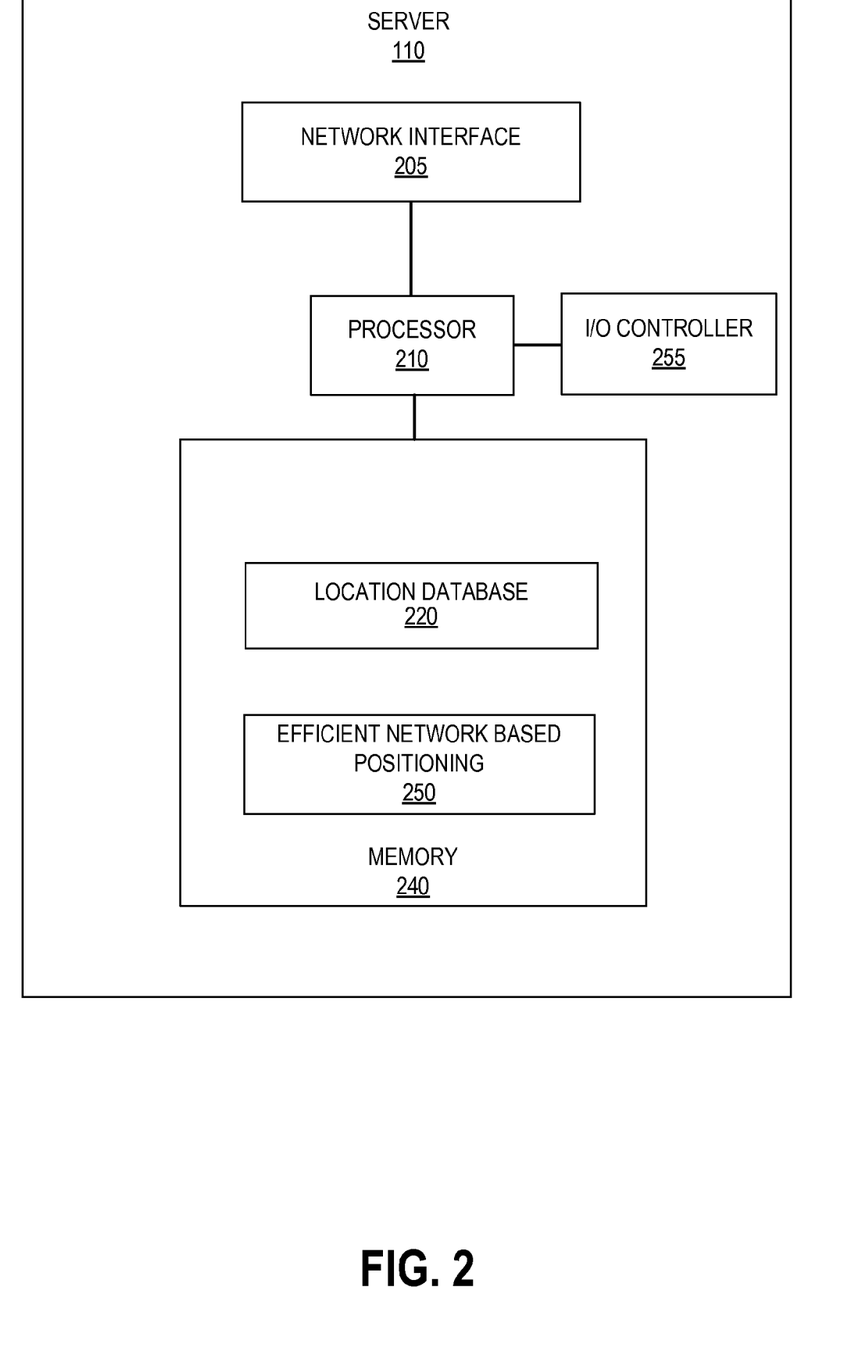
FIG. 2 is block diagram illustrating an exemplary server in which embodiments of Efficient Network Based Positioning may be practiced.

FIG. 2 is block diagram illustrating an exemplary server in which embodiments of Efficient Network Based Positioning may be practiced. For the sake of simplicity, the various features and functions illustrated in the box diagram of FIG. 2 are connected together using a common bus meant to represent that these various features and functions are operatively coupled together. Those skilled in the art will recognize that other connections, mechanisms, features, functions, or the like, may be provided and adapted as necessary to operatively couple and configure a data processing system (e.g., server 110). Further, it is also recognized that one or more of the features or functions illustrated may be further subdivided or combined.

The server 110 may include a network interface 205 configured to communicate with a network (e.g., network 112), which may be configured to communicate with other servers, computers, and devices (e.g., mobile device 108 and APs 100A-D).

A processor 210 may be connected to the network interface 205, and the memory 240. The processor may include one or more microprocessors, microcontrollers, and/or digital signal processors that provide processing functions, as well as other calculation and control functionality. Processor 210 may include any form of logic suitable for performing at least the techniques provided herein. For example, processor 210 may be operatively configurable based on instructions in memory 240 to selectively initiate one or more routines that exploit ENBP.

The memory 240 can store data and software instructions for executing programmed functionality within the server. The memory 240 may be on-board the processor 210 (e.g., within the same IC package), and/or the memory may be external memory to the processor and functionally coupled over a data bus. The details of software functionality associated with aspects of the disclosure will be discussed in more detail below.

A number of software modules or data tables may reside in memory 240 and be utilized by the processor 210 in order to manage communications, and ENBP functionality. As illustrated in FIG. 2, memory 240 may include location database 220, and the ENBP 250. One should appreciate that the organization of the memory contents as shown in FIG. 2 is merely exemplary, and as such the functionality of the modules and/or data structures may be combined, separated, and/or be structured in different ways depending upon the implementation of the mobile device. In one embodiment, ENBP 250 may be a process running on the processor 210 of the server 110, which provides for enhanced position management for mobile devices and APs as described herein. While the location database 220 and ENBP 250 shown in FIG. 2 are illustrated as contained in memory 240, it is recognized that in certain implementations such procedures may be provided for or otherwise operatively arranged using other or additional mechanisms. For example, all or part of ENBP module 250 may be provided in firmware. Additionally, while location database 220 and ENBP module 250 are illustrated as being separate features, it is recognized, for example, that such procedures may be combined together as one procedure or perhaps with other procedures, or otherwise further divided into a plurality of sub-procedures.

The location database 220 may store locations of APs and mobile devices. The server may optionally store auxiliary position/motion data in memory that may be derived from information received from various sources at the device 108 as described below. Moreover, in other embodiments, supplemental information may include, but not be limited to, information that can be derived or based upon Bluetooth signals, beacons, RFID (radio-frequency identification) tags, and/or information derived from a map (e.g., receiving coordinates from a digital representation of a geographical map by, for example, a user interacting with a digital map).

The server may include an input/output controller 255 to provide any suitable interface systems, such as a microphone/speaker, keypad, and display that allows for local input to the server.

Figure 3:
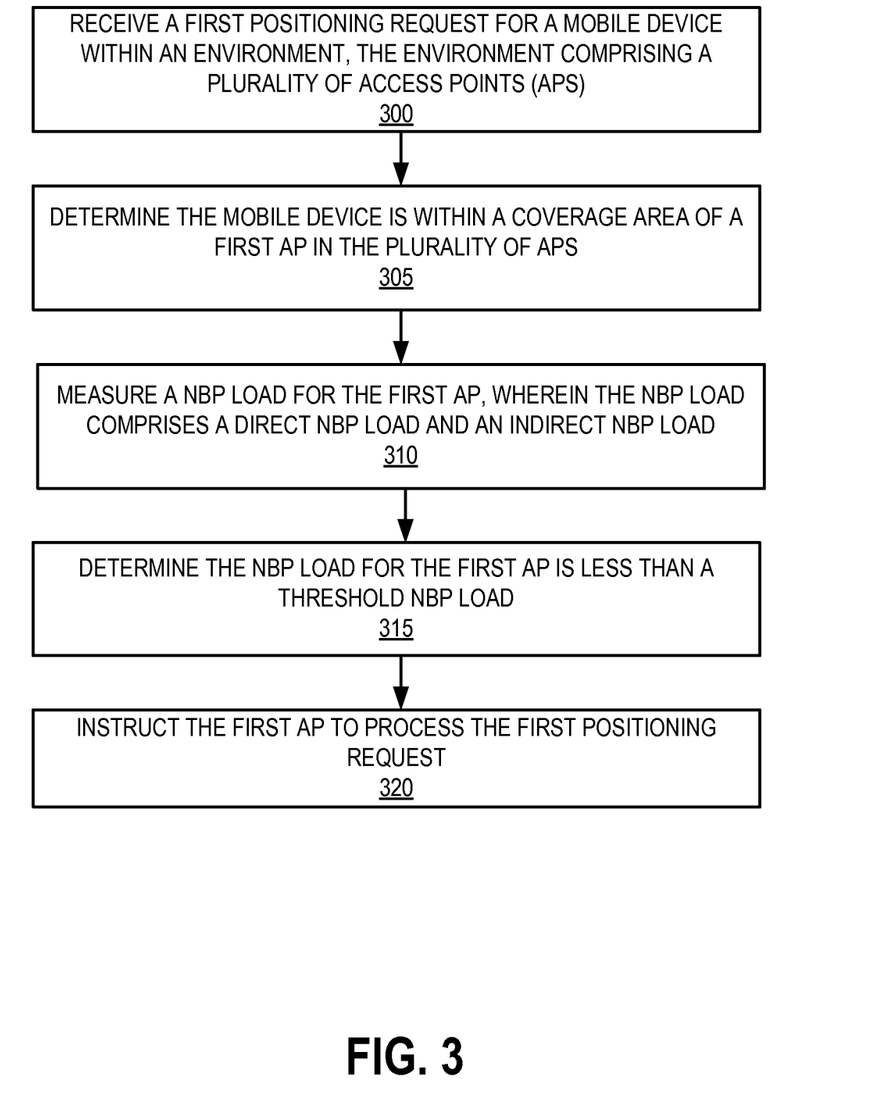
FIG. 3 illustrates a method for Efficient Network Based Positioning, in one embodiment.

FIG. 3 illustrates a method for Efficient Network Based Positioning, in one embodiment. At block 300, the embodiment (e.g., ENBP) receives a first positioning request for a mobile device within an environment, the environment comprising a plurality of APs. For example, the mobile device may request positioning assistance, or the venue may request that a mobile device be tracked while within the environment.

At block 305, the embodiment determines the mobile device is within a coverage area of a first AP in the plurality of APs. In one embodiment, a device is within a respective AP coverage area if the device has an established data connection to the AP or if the respective AP can sense and decode the packets transmitted by the device. Being within a coverage area of an AP may also be described as being "visible" to the AP. Other APs may also be within a coverage area of an AP if the AP can detect the other APs wireless data (e.g., packets or other signals).

At block 310, the embodiment measures a NBP load for the first AP, wherein the NBP load comprises a direct NBP load and an indirect NBP load. Direct NBP load can be defined as time spent by the respective AP sending or receiving data associated with mobile device positioning. For example, direct NBP load may include time spent by the first AP performing at least one of: sending measurement data, receiving measurement data, switching communication channels, sending keep-awake packets, or any combination thereof. Indirect NBP load can include data sent or received by a different (other) AP within a coverage area and operating (e.g., transmit and receive) on the same channel of the respective AP (e.g., the home-channel). For example, indirect NBP load may include time spent by APs within a coverage area of the a respective AP (e.g., the target or primary AP) performing, at least one of: sending measurement data on a home-channel of the respective AP, sending keep-awake packets on the home-channel of the respective AP, or any combination thereof. EBNP can calculate NBP load (e.g., a total NBP load) by summing the direct and indirect load for an AP.

At block 315, the embodiment determines the NBP load for the first AP is less than a threshold NBP load. In some embodiments, EBNP maintains a threshold NBP load to avoid oversaturating or overloading an AP with positioning requests. ENBP may monitor each respective AP's bandwidth use related to mobile device positioning. The threshold NBP load may be determined according to predetermined load limits or targets. For example, limits set by a network system administrator to ensure efficient usability for users on the network. In response to meeting the threshold NBP load (e.g., a specified minimum available amount of bandwidth to accommodate new requests) for the respective AP, additional positioning requests may be efficiently scheduled for processing by the respective AP. The server can iterate through each AP within the network of APs to schedule mobile device positioning requests within the respective AP's coverage area. Aided by NBP load information obtained from each respective AP, the server can schedule mobile device positioning requests concurrently for devices in non-overlapping coverage areas within the network. Advantageously, network based positioning inefficiencies such as collision and sequential positioning request overloads are reduced or eliminated.

At block 320, the embodiment instructs the first AP to process the first positioning request. For example, the server may send, to a respective AP, a request to perform positioning measurements.

Figure 4:
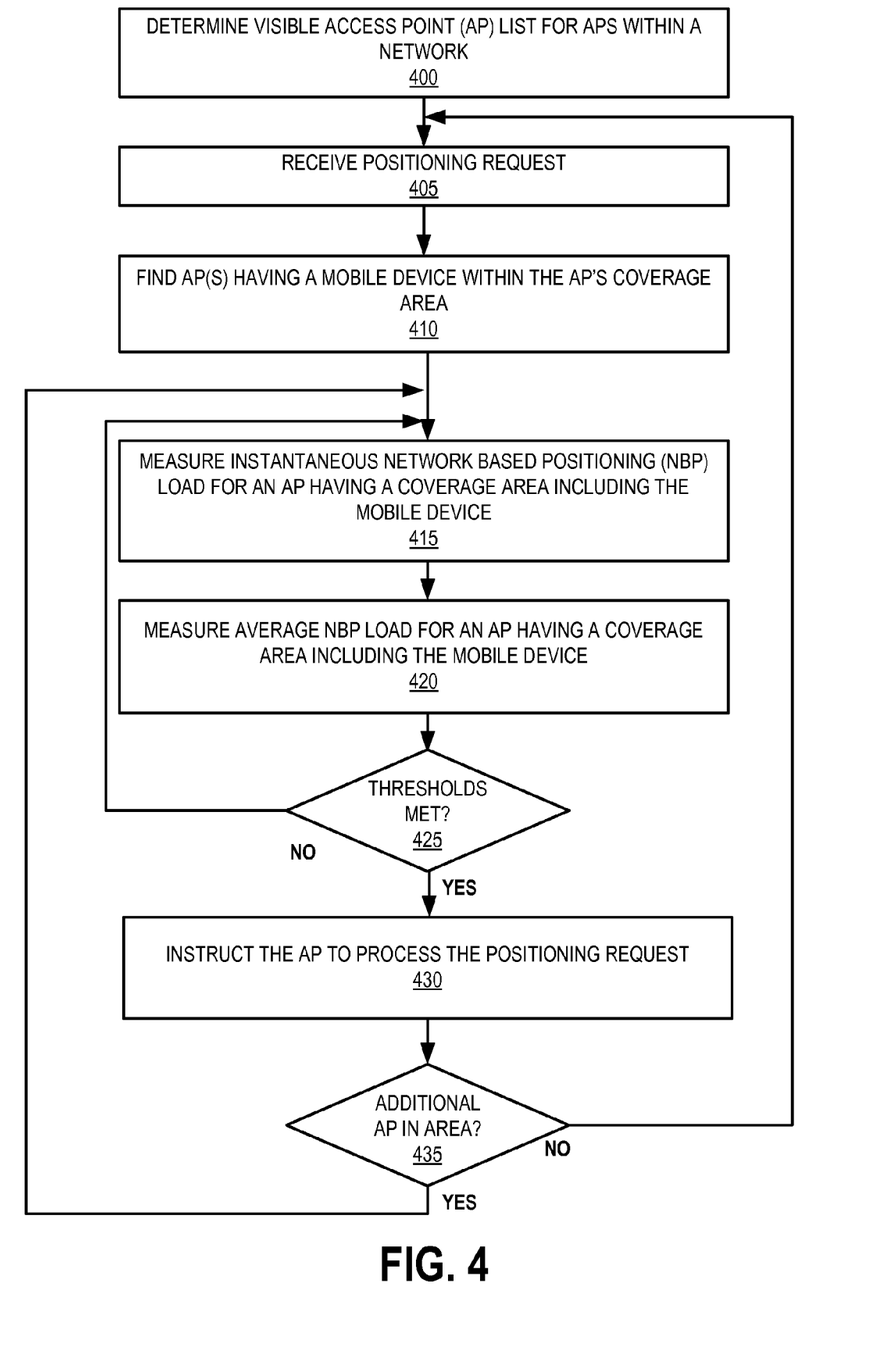
FIG. 4 illustrates a method for Efficient Network Based Positioning, in another embodiment.

FIG. 4 illustrates a method for Efficient Network Based Positioning, in another embodiment. At block 400, the embodiment (e.g., EBNP implemented at the server 110) determines a visible AP list for each AP in the network (e.g., APs 100A-D). For example, the server 110 may iterate coverage determinations through a set of APs, such that during each iteration one AP is considered a primary AP (e.g., AP 100A) and coverage is determined with respect to visible secondary APs (e.g., APs 100B-D) in the network. In one embodiment, secondary APs are visible to a primary AP if the primary can sense the packets transmitted by the secondary AP when both APs are operating on the same channel. Each respective AP has a total NBP load that is affected by measurement packets transmitted by the respective AP itself and also packets transmitted by visible APs (e.g., measurement packets). For each AP in a network of APs, a set of home-channel (e.g., main or designated operating channel of the primary AP, or a channel in which a majority of communication occurs for an AP) and off-channel (e.g., channels other than the home-channel) visible (secondary) APs can be determined relative to the primary AP. If expected/estimated RSSI between the primary and secondary APs is greater than a predetermined threshold (e.g., configurable), the secondary APs can be considered visible (e.g., within the coverage area of the primary AP). The visible AP list can be pre-computed (e.g., by server 110 or at each primary AP) for all the APs in the network. The visible AP list can be re-computed/analyzed periodically or aperiodically (e.g., when there is a change in the network configuration). Therefore, each AP can have an associated set of visible APs. In some embodiments, a server storing a location database containing visible AP associations maintains a visible AP list for each AP.

At block 405, the embodiment receives a positioning request. For example, a mobile device may request positioning assistance from a server directly, or a venue may request positioning of a mobile device within the venue.

At block 410, the embodiment finds AP(s) having a mobile device within the AP's coverage area. In one embodiment, the server iterates through one or more mobile devices that are the objects of positioning requests and determines an associated AP coverage area for each of the mobile devices. The server (e.g., server 110) can determine whether a device is in a particular AP's coverage area. Each device within the environment may be within one, or multiple AP coverage areas at the same time (e.g., concurrently or simultaneously). Mobile devices visible to (e.g., within the coverage area of) an AP may be associated or unassociated devices. Associated devices may be defined as devices electronically coupled to the AP, such as a connection for accessing the Internet or a local area network.

At block 415, the embodiment measures (e.g., computes or calculates) instantaneous NBP load for an AP within coverage having a device requesting position in their AP coverage area. In one embodiment, NBP load refers to NBP load associated with positioning of a mobile device in the network. For example, positioning measurement packets, device keep-awake packets and other positioning related data. In one embodiment, NBP load excludes data traffic associated with other aspects of an AP's network traffic unrelated to positioning or servicing positioning requests, such as providing Internet data access. NBP load may include of one or more of direct NBP load and indirect NBP load.

In one embodiment, direct NBP load represents a measurement of time spent by the AP while transmitting and receiving packets (e.g., positioning or measurement packets). Direct NBP load can include time spent by the AP in transmitting RTT/RSSI measurement packets in the home-channel, time spent by the AP in transmitting RTT/RSSI measurement packets in the off-channel, as channel change time, and time spent by AP in transmitting keep-awake packets (e.g., packets sent to keep a device out of power save mode).

In one embodiment indirect NBP load represents a measurement of time spent by visible APs in transmitting/receiving measurement packets in the operating (e.g. home or main) channel of a target/primary AP (e.g., AP 100A). This includes keep awake packets transmitted by home-channel visible APs and RTT/RSSI Measurement packets transmitted by visible APs in the primary AP (home) channel.

In one embodiment, ENBP analyzes NBP load as the combination of direct and indirect measurement load. ENBP may measure NBP load in percentages of 0 to 100 percent, such that a fully loaded network is a 100% load, while a network without any activity is 0%. When measured NBP load for an AP is below a configurable threshold NBP load (e.g., 60-80% load or some other predetermined metric), ENBP can schedule a new positioning request for devices within the AP's coverage area. In some embodiments, ENBP may request an AP clear all indirect NBP load before processing position requests. Indirect NBP load may be given higher priority because it represents time that the AP is away from its home-channel and is therefore unable to manage its home-channel traffic. Therefore, it may be advantageous in some implementations to request an AP to process indirect network requests before scheduling mobile device positioning requests. In other embodiments, ENBP may balance some indirect NBP load with positioning requests and indirect NBP load traffic may be given priority of execution over direct network traffic.

In one embodiment, NBP load is an instantaneous NBP load measured or calculated at a distinct point in time. ENBP may perform multiple instantaneous NBP load measurements over a period of time. For example, ENBP can determine an aperiodic or periodic NBP load measurement (e.g., every 100 milliseconds, or other configurable duration) for each of the APs in the environment. In one embodiment, when the measured instantaneous NBP load for an AP is below a configurable threshold NBP load, ENBP schedules a new positioning request for the device in the measured AP's coverage area.

At block 420, the embodiment measures average NBP load. ENBP can compute an average NBP load from a set of instantaneous measurement loads. For example, over a period of time (e.g., 10 milliseconds, 1 second, or some other duration) measured instantaneous NBP loads for an AP may be averaged together to determine an AP's average measurement. The period of time over which average NBP load is computed may be configurable (e.g., a user configuration file). For example, ENBP can compute average NBP load periodically (e.g., every 100 milliseconds. or some other duration) or aperiodically.

In one embodiment, when an average NBP load for an AP exceeds an average threshold NBP load, ENBP pauses scheduling (e.g., denies, or holds) positioning requests for the devices in the measured AP's coverage area. In one embodiment, an average threshold NBP load may be different (e.g., higher or lower in percentage of network saturation that is allowed) than an instantaneous threshold NBP load. For example, a venue may limit a percentage of total NBP load dedicated to positioning in order to allow for other network data use (e.g., communication data such as user's Internet access). Therefore, in order to allow for other activity on the network, an average threshold NBP load may be higher (e.g., allow for less network saturation) than the instantaneous threshold NBP load which may allow for greater network saturation for isolated instances in time.

At block 425, the embodiment determines if instantaneous and average threshold NBP loads are met. In one embodiment, both the instantaneous and average threshold NBP load is satisfied before proceeding to instructing an AP to process the AP request. As described above, the instantaneous threshold NBP load may be higher (e.g., allows for more network activity) than the average threshold NBP load. For example, the average threshold NBP load may be set in a way that takes into account that data use (e.g., Internet access) may be less susceptible to small packet delays at the AP. In contrast, NBP may yield noticeable performance differences when impacted with even small amounts of AP service delay. When instantaneous or average NBP load exceeds their respective threshold NBP load (instantaneous or average), the embodiment returns to block 415 and 420 measuring instantaneous and average NBP load until the bandwidth falls at or below the threshold NBP load. For example, ENBP may hold, or delay requests to process the positioning request at the respective AP.

At block 430, the embodiment instructs (e.g., in response to determining the thresholds were met) the AP to process the positioning request. When NBP load thresholds (e.g., instantaneous NBP load, average NBP load) are met (e.g., a target AP is below a configurable threshold), ENBP can schedule a positioning request for a device in the target AP's coverage area. If the thresholds were not met, the embodiment returns to block 415 to re-check instantaneous and average NBP load.

At block 435, the embodiment determines if there are additional APs for which the mobile device is within their coverage area. For example, a mobile device may be within multiple AP coverage areas. For each AP with the mobile device within its coverage area, ENBP returns to block 415 to determine whether the threshold NBP loads are met, and accordingly instructs the respective AP to process a positioning request. If a mobile device is within two AP coverage areas concurrently, ENBP determines whether the respective two APs are visible to each other. If the two APs are not visible (e.g., they are not within each others AP coverage area, also referred to herein as "disjoint") then positioning requests from the mobile device may be processed concurrently at each of the APs. Otherwise, ENBP determines when each respective AP has availability (e.g., threshold NBP load is met) to process a positioning request associated with the mobile device.

In one embodiment, ENBP can schedule or arrange two or more positioning requests within an AP's coverage area according to the expiration time or timeout of their request. For example, within an AP's coverage area, multiple positioning requests may be outstanding or waiting to be processed (e.g., the multiple requests may be associated with the same or different mobile devices in the coverage area). A positioning request having a short expiration time relative to all other request's expiration times may be scheduled for processing before a different device having a request set to expire later. In other words, ENBP can prioritize positioning requests according to timeout or expiration such that the next positioning request to expire or timeout will be serviced when a respective AP has availability (e.g., accord to threshold NBP load).

In one embodiment, an AP can determine whether positioning request is associated with a mobile device that is awake. An AP may also send requests to keep a device awake, and notify the server of each request's awake status. ENBP can monitor awake or timeout notifications received at the server to organize and schedule positioning requests in disjoint AP coverage areas concurrently. For example, awake devices may be prioritized over asleep devices. As used herein, concurrent scheduling describes two or more APs within the network scheduling positioning requests at the same time or approximately the same time (e.g., concurrently or simultaneously). For example, with respect to FIG. 1, a device in coverage area 190A may be scheduled for processing by AP 100A at the same time as a device in coverage area 190C is being processed by AP 100C. ENBP can perform the scheduling described herein for both single channel and multi-channel network AP configurations.

Aspects of ENBP disclosed in the above description and related drawings are directed to specific embodiments of the invention. Alternate embodiments may be devised without departing from the scope of the invention. Additionally, well-known elements of the invention may not be described in detail or may be omitted so as not to obscure the relevant details of the invention.

The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

ENBP may be implemented as software, firmware, hardware, module (e.g., ENBP module 250) or engine. In one embodiment, the previous ENBP description (e.g., the methods illustrated in FIGS. 3 and 4) may be implemented by the general purpose processor (e.g., processor 210 in AP 100) to achieve the previously desired functions.

It should be appreciated that when the AP 100 is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a wearable device (e.g., headphones, watch, an earpiece, etc.), a user I/O device, a computer, a server, a point-of-sale device, an entertainment device, a set-top box, or any other suitable device.

In some aspects a wireless device may comprise an access device (e.g., a WiFi access point) for a communication system. Such an access device may provide, for example, connectivity to another network (e.g., a wide area network such as the Internet or a cellular network) via a wired or wireless communication link. Accordingly, the access device may enable another device (e.g., a WiFi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for network based positioning (NBP), the method comprising:
   receiving a first positioning request for a mobile device within an environment, the environment comprising a plurality of access points (APs);
   determining the mobile device is within a coverage area of a first AP in the plurality of APs;
   measuring a NBP load of the first AP, wherein the NBP load comprises a direct NBP load and an indirect NBP load, wherein the indirect NBP load of the first AP comprises time spent by a second AP within the coverage area of the first AP sending range measurement data on a first channel of the first AP, the first channel being a home channel of the first AP;
   determining the NBP load for the first AP is less than a threshold NBP load; and
   instructing the first AP to process the first positioning request.

2. The method of claim 1, wherein the direct NBP load of the first AP comprises time spent by the first AP performing at least one of: sending range measurement data, receiving range measurement data, switching communication channels, sending keep-awake packets, or any combination thereof.

3. The method of claim 1, wherein the indirect NBP load of the first AP comprises time spent by a second AP within the coverage area of the first AP performing, at least one of: sending measurement data on a first channel of the first AP, sending keep-awake packets on the first channel of the first AP, or any combination thereof.

4. The method of claim 1, wherein the coverage area comprises a section of the environment where the first AP detects packets transmitted by the mobile device.

5. The method of claim 1, wherein the instructing the first AP to process the first positioning request is performed in response to determining the first positioning request is a next positioning request to timeout.

6. The method of claim 1, wherein the instructing the first AP to process the first positioning request is performed in response to:
   determining the mobile device is within a coverage area of a second AP in the plurality of APs concurrently with being in the coverage area of the first AP; and
   selecting, in response to determining the NBP load for the first AP is less than the second AP's NBP load, the first AP to process the first positioning request.

7. The method of claim 1, further comprising:
   determining a second AP is outside of the coverage area of the first AP, wherein the coverage area comprises a section of the environment where the first AP detects packets transmitted by the second AP.

8. The method of claim 7, further comprising:
   instructing the second AP to process a second positioning request concurrently with the first AP's processing of the first positioning request.

9. A machine readable non-transitory storage medium containing executable program instructions which cause a data processing device to perform a method for network based positioning comprising:
   receiving a first positioning request for a mobile device within an environment, the environment comprising a plurality of access points (APs);
   determining the mobile device is within a coverage area of a first AP in the plurality of APs;
   measuring a NBP load of the first AP, wherein the NBP load comprises a direct NBP load and an indirect NBP load, wherein the indirect NBP load of the first AP comprises time spent by a second AP within the coverage area of the first AP sending range measurement data on a first channel of the first AP, the first channel being a home channel of the first AP;
   determining the NBP load for the first AP is less than a threshold NBP load; and
   instructing the first AP to process the first positioning request.

10. The medium of claim 9, wherein:
    the direct NBP load of the first AP comprises time spent by the first AP performing at least one of: sending range measurement data, receiving range measurement data, switching communication channels, sending keep-awake packets, or any combination thereof; and
    the indirect NBP load of the first AP is measured as time spent by a second AP within the coverage area of the first AP sending keep-awake packets on the first channel of the first AP.

11. The medium of claim 9, wherein the coverage area comprises a section of the environment where the first AP detects packets transmitted by the mobile device.

12. The medium of claim 9, wherein the instructing the first AP to process the first positioning request is performed in response to determining the first positioning request is a next positioning request to timeout.

13. The medium of claim 9, wherein the instructing the first AP to process the first positioning request is performed in response to:
    determining the mobile device is within a coverage area of a second AP in the plurality of APs concurrently with being in the coverage area of the first AP; and
    selecting, in response to determining the NBP load for the first AP is less than the second AP's NBP load, the first AP to process the first positioning request.

14. The medium of claim 9, further comprising:
    determining a second AP is outside of the coverage area of the first AP, wherein the coverage area comprises a section of the environment where the first AP detects packets transmitted by the second AP; and
    instructing the second AP to process a second positioning request concurrently with the first AP's processing of the first positioning request.

15. A server to provide network based positioning comprising:
    a processor; and
    a storage device coupled to the processor and configurable for storing instructions, which, when executed by the processor, cause the processor to:
    receive a first positioning request for a mobile device within an environment, the environment comprising a plurality of access points (APs);
    determine the mobile device is within a coverage area of a first AP in the plurality of APs;
    measure a NBP load of the first AP, wherein the NBP load comprises a direct NBP load and an indirect NBP load, wherein the indirect NBP load of the first AP comprises time spent by a second AP within the coverage area of the first AP sending range measurement data on a first channel of the first AP, the first channel being a home channel of the first AP;
    determine the NBP load for the first AP is less than a threshold NBP load; and
    instruct the first AP to process the first positioning request.

16. The server of claim 15, wherein the direct NBP load of the first AP comprises time spent by the first AP performing at least one of: sending range measurement data, receiving range measurement data, switching communication channels, sending keep-awake packets, or any combination thereof.

17. The server of claim 15, wherein the indirect NBP load of the first AP comprises time spent a second AP within the coverage area of the first AP performing, at least one of: sending measurement data on a first channel of the first AP, sending keep-awake packets on the first channel of the first AP, or any combination thereof.

18. The server of claim 15, wherein the coverage area comprises a section of the environment where the first AP detects packets transmitted by the mobile device.

19. The server of claim 15, wherein the instructing the first AP to process the first positioning request is performed in response to determining the first positioning request is a next positioning request to timeout.

20. The server of claim 15, wherein the instructing the first AP to process the first positioning request is performed in response to executing instructions to:
   determine the mobile device is within a coverage area of a second AP in the plurality of APs concurrently with being in the coverage area of the first AP; and
   select, in response to determining the NBP load for the first AP is less than the second AP's NBP load, the first AP to process the first positioning request.

21. The server of claim 15, further comprising instructions to:
   determine a second AP is outside of the coverage area of the first AP, wherein the coverage area comprises a section of the environment where the first AP detects packets transmitted by the second AP.

22. The server of claim 21, further comprising instructions to:
   instruct the second AP to process a second positioning request concurrently with the first AP's processing of the first positioning request.

23. An apparatus for network based positioning comprising:
   means for receiving a first positioning request for a mobile device within an environment, the environment comprising a plurality of access points (APs);
   means for determining the mobile device is within a coverage area of a first AP in the plurality of APs;
   means for measuring a NBP load of the first AP, wherein the NBP load comprises a direct NBP load and an indirect NBP load, wherein the indirect NBP load of the first AP comprises time spent by a second AP within the coverage area of the first AP sending range measurement data on a first channel of the first AP, the first channel being a home channel of the first AP;
   means for determining the NBP load for the first AP is less than a threshold NBP load; and
   means for instructing the first AP to process the first positioning request.

24. The apparatus of claim 23, wherein the direct NBP load of the first AP comprises time spent by the first AP performing at least one of: sending range measurement data, receiving range measurement data, switching communication channels, sending keep-awake packets, or any combination thereof.

25. The apparatus of claim 23, wherein the indirect NBP load of the first AP comprises time spent a second AP within the coverage area of the first AP performing, at least one of: sending measurement data on a first channel of the first AP, sending keep-awake packets on the first channel of the first AP, or any combination thereof.

26. The apparatus of claim 23, wherein the coverage area comprises a section of the environment where the first AP detects packets transmitted by the mobile device.

27. The apparatus of claim 23, wherein the instructing the first AP to process the first positioning request is performed in response to determining the first positioning request is a next positioning request to timeout.

28. The apparatus of claim 23, wherein the instructing the first AP to process the first positioning request is performed in response to:
   means for determining the mobile device is within a coverage area of a second AP in the plurality of APs concurrently with being in the coverage area of the first AP; and
   means for selecting, in response to determining the NBP load for the first AP is less than the second AP's NBP load, the first AP to process the first positioning request.

29. The apparatus of claim 23, further comprising:
   means for determining a second AP is outside of the coverage area of the first AP, wherein the coverage area comprises a section of the environment where the first AP detects packets transmitted by the second AP.

30. The apparatus of claim 29, further comprising:
   means for instructing the second AP to process a second positioning request concurrently with the first AP's processing of the first positioning request.

* * * * *